United States Patent [19]

Bock

[11] Patent Number: 5,010,621

[45] Date of Patent: Apr. 30, 1991

[54] GLIDE ASSEMBLY WITH INSIDE HOLDING CLIP

[75] Inventor: Robert E. Bock, Woodbury, Conn.

[73] Assignee: Illinois Tool Works, Inc., Glenview, Ill.

[21] Appl. No.: 437,388

[22] Filed: Nov. 16, 1989

[51] Int. Cl.$^5$ .................................................. B60B 33/00
[52] U.S. Cl. ........................................ 16/39; 16/42 T
[58] Field of Search ................. 16/39, 42 R, 42 T, 38, 16/43

[56] References Cited

U.S. PATENT DOCUMENTS

| | | |
|---|---|---|
| 631,579 | 8/1899 | Neuberth . |
| 670,937 | 4/1901 | McCauley . |
| 685,073 | 10/1901 | Wasbrood . |
| 967,152 | 8/1910 | Appleby . |
| 1,743,143 | 1/1930 | Johnson . |
| 1,912,795 | 6/1933 | Rice et al. . |
| 2,640,219 | 6/1953 | Becker ............................... 16/42 T |
| 2,706,135 | 4/1955 | Douglas et al. ........................ 301/63 |
| 2,748,419 | 6/1956 | Kramcsak, Jr. ....................... 16/42 T |
| 2,848,733 | 8/1958 | Thornbury ............................ 16/42 T |
| 3,000,042 | 9/1961 | Reynolds ............................. 16/42 T |
| 3,006,673 | 10/1961 | Swick ..................................... 287/87 |
| 3,065,494 | 11/1962 | Fontana ............................... 16/42 R |
| 3,721,315 | 3/1973 | Wehner ................................. 182/15 |
| 3,755,853 | 9/1973 | Barile ..................................... 16/42 |
| 4,731,900 | 3/1988 | Frobose ................................... 16/38 |

FOREIGN PATENT DOCUMENTS 750942 6/1956 United Kingdom ................. 16/42 T

Primary Examiner—Richard K. Seidel
Assistant Examiner—Edward A. Brown
Attorney, Agent, or Firm—Schwartz & Weinrieb

[57] ABSTRACT

An inner-gripping glide assembly with an outer sleeve for mounting upon the end of a tubular member, which glide has an upright pedestal with outwardly extending gripping prongs for insertion into the tubular member and wherein a relatively wide gap is provided between the pedestal and sleeve so as to allow the tubular member to nest against the bottom surface of the sleeve thereby allowing maximum penetration by means of the pedestal-mounted gripping prongs into the tubular member and avoidance of plating-process flashing which may be formed upon the inner wall surfaces of the tubular member within the vicinity of the open end thereof.

10 Claims, 1 Drawing Sheet

GLIDE ASSEMBLY WITH INSIDE HOLDING CLIP

FIELD OF THE INVENTION

The present invention generally relates to a foot member for a tubular shaft and more particularly to a glide assembly for the leg of a furniture piece, such as, for example, upon desks, chairs, and stools.

BACKGROUND OF THE INVENTION

Glides and casters are used upon furniture so as to provide a wearing and sliding surface for the furniture, as well as providing a decorative flair. Glides come in various shapes, sizes and forms, such as, for example, inside-gripping and outside-gripping glides. The outside-gripping glides frequently include a barrel-shaped sleeve with a crimped or rolled-over end and a smooth base permanently attached to the sleeve. The tubular end of the furniture leg may be swaged and tapered, and the glide sleeve can be drivingly mounted upon the tubular end with the crimped edge engaging the outer tubular wall so as to frictionally grip and secure the glide. However, variations in manufacturing tolerances of both the tubing and the glide sleeve may lead to a coupling between the two elements which is not secure enough in order to maintain the glide upon the tubular end. In addition, the tubes are often chrome-plated or otherwise provided with a hard, smooth coating which further inhibits the gripping action of the glide sleeve upon the tubular end.

An alternative to the outside-gripping glide is the internally-gripping glide. A pedestal for insertion into the tubing end may project upwardly from the glide base and have extending fingers or arms. The gripping arms or fingers contact the inner wall of the tube so as to secure the glide within the tubular end. However, some of these inner-gripping glides present assembly problems for the following reasons: the necessary clearance for easy installation is not always or properly provided; the attendant flashing associated with plating at the tube ends inhibits gripping finger contact and gripping force for the glide; and a domelike mounting structure is sometimes included, which limits tube end penetration into the sleeve.

Tubular members extending from a seat or table are specific examples of furniture legs and a glide or caster is mounted upon the leg end so as to contact the floor. The glide provides a smooth, wearing surface for the furniture leg thus otherwise avoiding abrasive sliding by means of the relatively rough or sharp tube end, and also allows the furniture to be more easily moved upon a floor. The inner-gripping glides must be able to be secured to a tubular leg, which legs are frequently seam-welded tubing that have been plated with a hard coating, such as, for example, chrome. The plating operations often produce a chrome flash upon the inner surface of the tube, which must be overcome by means of an inner-grip glide. As noted, these tubular legs are frequently swaged and tapered and thus the outside-gripping glides must accommodate the hard-coating plated surface. The inner-gripping glides must accommodate the hard-coating flashing and an attendant seam kink frequently encountered with swaged, seam-welded tubing. In addition, the glides are often driven onto the tubing ends with a mallet and must be able to withstand this driving force without deformation of the glide structure or impairment of its operation. Therefore, a glide is desired, which overcomes these assembly detriments and enhances or expedites the furniture assembly operation.

SUMMARY OF THE INVENTION

The present invention provides a glide assembly, which is particularly used upon furniture legs, with the aesthetic attributes of an outside-gripping glide so as to mask a rough or protruding tubular end, and which incorporates the gripping strength of an inner-gripping glide. The present glide accommodates tolerance variations in either the glide assembly and/or the tubular end while maintaining the gripping strength of the glide. A hardened inner gripping clip has a relatively narrow support or pedestal with gripping fingers at the perimeter of its protruding end, which pedestal extends a sufficient length so as to avoid contact with or impairment from any flashing upon the tubular inner wall. The gripping fingers are spaced so as to avoid kinks within the swaged end of the seam-welded tubing. In addition, the glide base is both pivotable and rotatable so as to accommodate positional variations of the assembled furniture. This base arrangement does not inhibit installation of the internal-mount glide or tubular end insertion within the sleeve end. The hardened pedestal has sufficient strength to bear the assembly forces applied to the glide during mounting upon the tubular end.

BRIEF DESCRIPTION OF THE DRAWINGS

Various other objects, features, and attendant advantages of the present invention will be more fully appreciated from the following detailed description, when considered in connection with the figures of the drawings, like reference numerals identify like components throughout the several views, and wherein.

DETAILED DESCRIPTION OF THE PREFERRED EMBODIMENT

Figure 1:
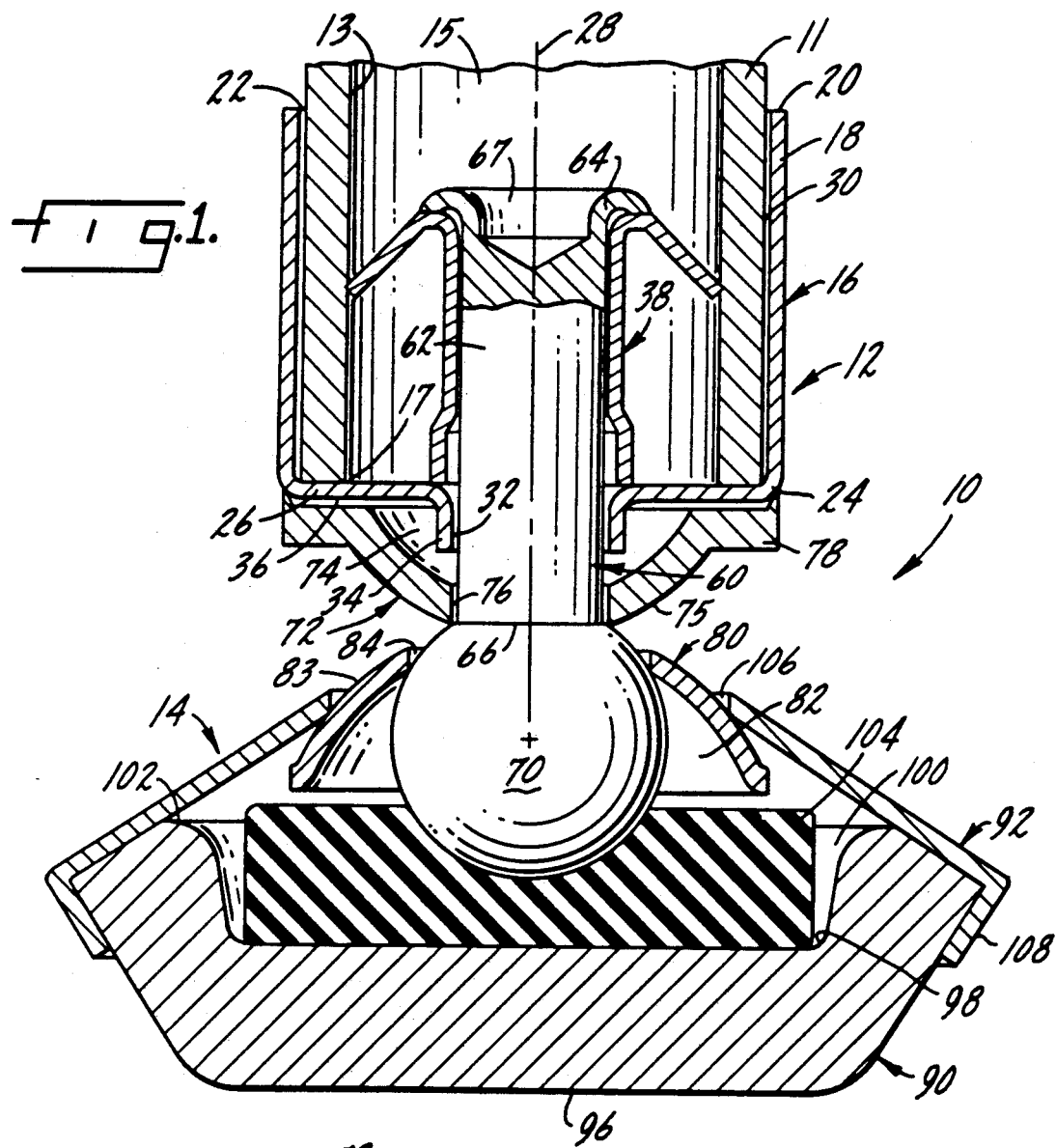
FIG. 1 is an elevational view in cross-section of a glide assembly constructed in accordance with the present invention.

A glide for use with tubular members is provided with an inner-tube gripping capability, which glides are particularly used upon the legs of furniture, and they preserve the aesthetic virtue of the outside tube gripping glide. In FIG. 1, a glide 10 is illustrated as comprising an upper subassembly 12 and a lower subassembly 14 which is inserted into the upper subassembly which includes a tubular member 11 with inner wall 13, a cavity 15 and an end wall 17.

Upper subassembly 12 has a generally cylindrical sleeve or ferrule 16 which includes a sidewall 18, a top edge 20, an opening 22 at the top edge 20, a lower edge 24 with a bottom wall 26 to seal the lower end 24 of sleeve 16, a longitudinal axis 28 and an enclosure 30. Bottom wall 26 has an outer surface 36 and a generally axially positioned aperture 32 bounded by means of an annular collar 34 extending downwardly from bottom-end, outer surface 36.

Figure 2:
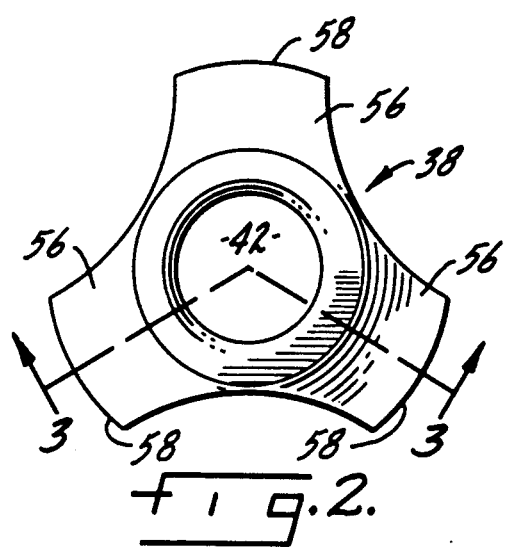
FIG. 2 is a top plan view of the gripping clip of FIG. 1.
Figure 3:
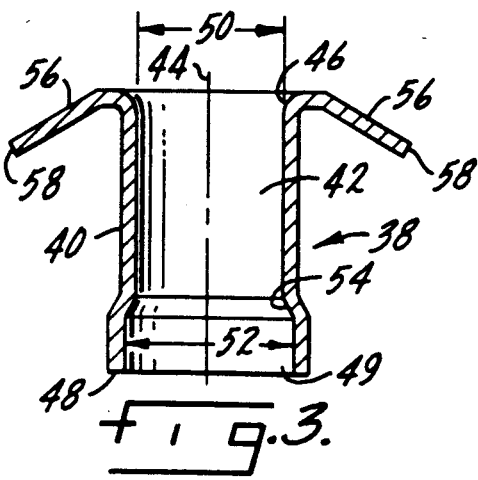
FIG. 3 is an elevational view in cross-section of the gripping clip of FIG. 2.

A clip 38, which is shown in detail in FIGS. 2 and 3, has a generally cylindrical body 40 with a first cross-sectional diameter 50, a bore or cavity 42, a longitudinal axis 44, an upper end 46 and a lower end 48. Body 40 at lower end 48 is somewhat expanded radially outwardly with respect to axis 44 so as to provide an enlarged section 49, which has a diameter 52 greater than diameter 50 of body 40. Expanded section 49 and body 40 intersect each other at shoulder 54, which is illustrated as slightly tapered for a smooth transition between the first section cavity 42 and enlarged section 49.

A plurality of radially extending tabs or gripping fingers 56 with contact edges 58, which are preferably three in number as shown in FIGS. 2 and 3, are equiangularly spaced about upper end 46 of clip 38. As shown in the Figures, clip 38 is a unitary structure with the several elements formed from a single component. Tabs 56 extend radially outwardly from clip body 40 and are formed at upper end 46 at an acute angle with respect to the axis 44 of clip body 40. Body 40 and tabs 56 are heat treated and hardened so as to provide strength and stiffness after the formation thereof, but the hardened structure is subsequently tempered so as to enhance the flexural characteristics of tabs 56 in order to aid in the installation of glide 10 and especially clip 38 into the tubular member 11.

A rivet 60 in FIG. 1 has a shaft 62 with a first upper end 64, a second lower end 66 and a longitudinal axis, which is coaxial with axis 28 in this Figure. A blindhole bore 67 extends into shaft 62 at first end 64 and a free end portion 70, which is illustrated as a sphere or ball, is affixed to second end 66. A first annular washer 72 with a generally spherically-shaped, concave depression 74 and outer surface 75, which is downwardly convex as shown in the Figures, has a central bore or aperture 76 and a flat, annular collar 78. A second annular washer 80 with a downwardly facing concave depression 82 and spherically-shaped outer surface 83, as oriented in FIGS. 1 and 2, has a central passage 84 with rivet shaft 62 extending therethrough.

Rivet shaft 62 extends through passage 84 of second annular washer 80 so as to nest spherical portion 70 within concave depression 82, and aperture 76 of first annular washer 72. Concave depression 74 is disposed in a facing relationship, and oppositely directed, with respect to concave depression 82. The curved outer surfaces of the first and second annular washers 72 and 80 are arranged so as to tangentially bear against, and have sliding contact with, each other during pivotal movements of the base or lower subassembly 14.

Clip 38 is positioned within cavity 15 with the longitudinal axes 28 and 44 generally aligned and coextensive with respect to each other. Expanded section 49 contacts bottom wall 26 of sleeve 16 with rivet shaft 62 extending through sleeve aperture 32, clip cylinder bore 42 and beyond clip upper end 46. Shaft first end 64 at blindhole bore 67 is rolled or formed over clip upper end 46 so as to simultaneously anchor clip 38 within sleeve 18 as well as to secure the first and second washers 72 and 80 in position with respect to each other as a result of the gripping contact defined between clip tabs 56 and the interior wall 13 of tubular member 11. Rivet shaft 62 may be secured to clip 38 by any means known in the art including welding, brazing or adhesives.

Lower subassembly 14 has a base 90 and a cap 92. Base 90 is generally cup-shaped with a relatively flat, lower, outer-surface 96, an inner surface 98, a cavity 100 defined by means of inner surface 98, and an upper lip or rim 102. A bearing pad or wearing component 104 is positioned within cavity 100, which may be of any material such as for example thermoplastic rubber (TPR). Cap 92, which is illustrated as a truncated cone, has a central port 106 and an overhanging ledge 108 contacting upper rim 102 of base 90. Ledge 108 is crimped or formed so as to secure cap 92 to base 90, whereby cap 92 and base 90 cooperate to generally enclose cavity 100.

In FIG. 1, second washer 80 is positioned and retained within the upper part of cavity 100 with its outer surface 83 contacting the upper edge portion of cap 92 which defines port 106. Spherical ball 70 is freely pivotable and rotatable within cavity 100 and bears against pad 104 for providing quiet movement of glide 10. Thus, lower subassembly 14 and upper subassembly 12 are coupled by rivet 62 so as to provide glide assembly 10.

Sleeve 18 in FIG. 1 is mounted upon the outside of tubular member 11, and clip 38 with tabs 56 is pushed into the tubular bore 15 beyond any flashing which may exist as a result of a plating process performed in connection with tubular member 11. The three-pronged tab arrangement of clip 38, which has been hardened and tempered, flexes for ease of assembly, avoids kinks formed within the tubing, especially at a swaged, seam-welded joint thereof, and grips or engages tubular inner wall 13 by means of its tab ends 58. The downwardly directed angle of tabs 56 allows edges 58 to grip the inner wall of the tubular bore and to secure glide 10 within the tubular end.

Although clip 38 is relatively long it is a hardened material with a hardness of approximately Rockwell C 44–47, which provides a strong, rigid element with a minimal mass as opposed to earlier structures having bell-shaped ends affixed to the bottom wall, which limited the seating of the tubular end away from the sleeve bottom wall 26. Clip 38 has a substantially straight sidewall with relatively narrow diameters 50 and 52, which provides a significant clearance distance between body 40 and tubular inner wall 13. Thus, tubular member end 17 may be driven to the bottom of chamber 30 defined within sleeve member 16 so as to contact lower wall 26 without impedance from a lower supporting structure for clip 38. This rigid clip also provides the necessary rigidity to allow the glide 10 to be driven onto the tubular end, such as by a mallet, without concern for damaging the structure or negatively influencing its operability in the field; and at the preferred hardness, clip 38 has the flexural strength to allow deflection and recovery of tabs 56 during the mounting of the glide upon the tubular end.

While only a specific embodiment of the invention has been described and shown, it is apparent that various alternatives and modifications can be made thereto. Those skilled in the art will recognize that certain variations can be made to the illustrated embodiment. It is, therefore, the intention of applicant to cover all such modifications and alternatives as may fall within the true scope of the invention as defined by means of the appended claims.

What is claimed is:

1. An inner gripping glide assembly for mounting upon a tubular member, wherein said tubular member has an inner surface and an outer surface, comprising:
an upper sub-assembly, for mounting said glide assembly upon said tubular member, comprising a substantially cup-shaped housing having an upstanding peripheral wall for engaging said outer surface of said tubular member, and an end wall for engaging a lower open end of said tubular member, an aperture being defined within said end wall of said housing; and a tubular clip comprising a body having a longitudinal axis, a first lower end of said body being engaged with said end wall of said housing, and a plurality of resiliently flexible gripping prongs extending downwardly from a second upper end of said tubular clip body at a predetermined acute angle with respect to said longitudinal axis of said tubular clip body and integrally formed therewith as a single piece for resiliently and flexibly engaging said inner surface of said tubular member so as to retain said upper sub-assembly, and said glide assembly, upon said tubular member, said tubular clip body and said prongs having the same relatively small thickness dimension such that said prongs are resiliently flexible and wherein the outer diametrical extent of said tubular clip body is only slightly greater than the inner diametrical extent thereof whereby the outer peripheral surface of said tubular clip body is remotely spaced from said inner surface of said tubular member so as to permit said prongs to undergo substantial flexure toward and away from said tubular clip body in order to accommodatingly engage said inner surface of a particular one of a plurality of tubular members having different internal diametrical dimensions;

a lower sub-assembly having a floor-engaging base of said glide assembly mounted thereon; and means, engaged at one end thereof with said lower sub-assembly, and projecting upwardly through said aperture, defined within said end wall of said housing of said upper sub-assembly, and said tubular clip body such that a second end thereof engages said second upper end of said tubular clip body, for coupling said lower sub-assembly to said upper sub-assembly.

2. An assembly as set forth in claim 1, wherein:
said plurality of prongs comprises three prongs equiangularly spaced about said longitudinal axis of said tubular clip body.

3. A glide assembly as claimed in claim 1 wherein said clip and body are hardened to at least Rockwell C-44.

4. A glide assembly as claimed in claim 1, wherein:
said first lower end of said tubular clip body is expanded radially outwardly from said longitudinal axis so as to provide an enlarged contact area with said end wall of said housing.

5. A glide assembly as claimed in claim 1 wherein said coupling means comprises a concave washer, a convex washer, and a rivet;
said concave washer having an annular flange, an outer concave surface and a central aperture;
said convex washer having a centrally positioned through-bore, a convex depression and an outer convex surface;
said rivet having a shaft with a first end and a second end, a generally spherical free end secured at one of said first and second shaft ends;
said concave and convex outer surfaces being aligned so as to position said central aperture and through-bore in substantial alignment with each other and wherein said outer surfaces are rotatable with respect to each other for providing substantially tangential contact with each other;
said shaft extending through said central aperture and said through-bore with said spherical free end nested in said convex washer depression to provide relative rotational and pivotal motion between said upper and lower subassemblies of said glide assembly.

6. A glide assembly as claimed in claim 5 wherein said lower subassembly comprises a cup-shaped base with a lower surface, an enclosure and an outer edge;
a cap, which is generally a truncated cone with a central orifice, said cap mounted and secured to said base;
said convex washer and said spherical free end positioned and operable in said enclosure.

7. A glide assembly as claimed in claim 5 wherein the other of said rivet shaft first and second ends extends beyond said one clip end and is outwardly formed to contact and generally conform to said clip first end to secure said rivet shaft, said clip, said housing, said concave and convex washers, and said lower assembly.

8. A glide assembly as claimed in claim 6, said lower subassembly further comprising a pad, said pad mounted and operable in said base enclosure, which pad is operable as a wearing surface for said spherical free end.

9. A glide assembly as claimed in claim 8 wherein said pad is a thermoplastic rubber.

10. A glide assembly as claimed in claim 5 wherein each of said housing and said clip have a generally cylindrical shape.

* * * * *